(No Model.)

R. H. FINLAY.
POT FOR CONDIMENTS AND THE LIKE.

No. 388,657. Patented Aug. 28, 1888.

UNITED STATES PATENT OFFICE.

ROBERT H. FINLAY, OF GLASGOW, COUNTY OF LANARK, SCOTLAND.

POT FOR CONDIMENTS AND THE LIKE.

SPECIFICATION forming part of Letters Patent No. 388,657, dated August 28, 1888.

Application filed April 18, 1888. Serial No. 271,029. (No model.) Patented in England October 28, 1887, No. 14,683.

*To all whom it may concern:*

Be it known that I, ROBERT HUNTER FINLAY, a citizen of the United Kingdom of Great Britain and Ireland, residing at 109 Hope street, Glasgow, in the county of Lanark, Scotland, have invented new and useful Improvements in Pots or Vessels for Containing Made Mustard, Condiments, and the Like, which has not been patented in any country except Great Britain, by Letters Patent dated October 28, 1887, No. 14,683; and I do hereby declare that the following is a full, clear, and exact description of the invention, which will enable others skilled in the manufacture or art to which it relates to make and use the same.

This invention, which relates to pots or vessels for containing made mustard, other condiments, and the like, has for its object to dispense with the necessity of using a spoon or fork for the purpose of serving the condiment, these, when left in pots or vessels of ordinary construction, being liable to corrosion or oxidation, and to have an effect on the contents of the vessel injurious to health.

Figure 1:
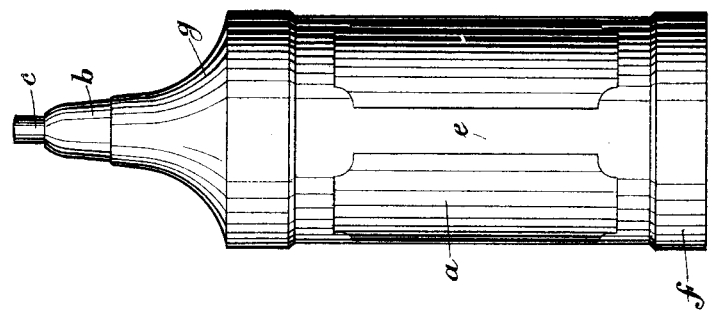
Figure 2:
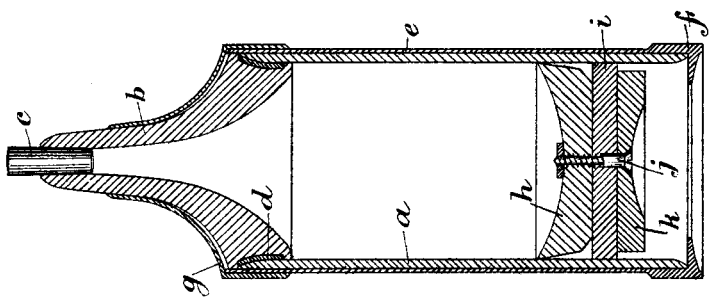

On the accompanying drawings, Figure 1 is an elevation of the improved pot or vessel constructed in accordance with my invention; Fig. 2 is a vertical section of Fig. 1; and Fig. 3 is another vertical section with a modified arrangement of stopper.

Figure 3:
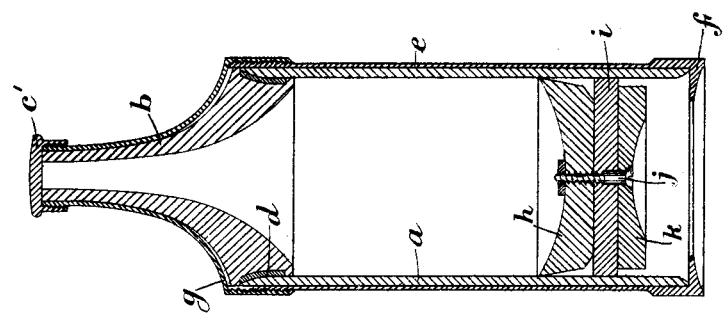

As shown by these figures, the improved pot or vessel consists of a tubular or cylindrical part, $a$, open at both ends, the upper extremity having fitted into it a portion, $b$, which constitutes the neck of the vessel, and is closed with a cork or plug, $c$, as at Fig. 2, or with a screwed cap or cover, $c'$, as at Fig. 3, or the said cap or cover may be pushed on. At the part where the neck $b$ fits into the cylindrical body $a$ it is preferably recessed or countersunk, and a ring, $d$, of india-rubber, leather, or other flexible and elastic material, is placed upon the countersunk or recessed portion, as shown, to insure that the joint shall be liquid-tight.

The parts $a$ and $b$ may be made of metal, in which case they are enameled on the inside to prevent corrosion; or they may be made of glass, earthenware, wood, or the like, or the part $a$ may be made of one material and the part $b$ of another, and when they are joined, as shown by Figs. 2 and 3, to hold them more securely together, the cylindrical body $a$ is slipped into an open or close metal or other casing, $e$, which has a ledge or collar, $f$, at its lower end for the bottom of the cylinder $a$ to rest upon, while at its upper end the said casing has a cover, $g$, (inclosing the neck $b$,) screwed or otherwise secured to it. At its interior the body $a$ contains a movable piston or expeller, which, when in its lowest position, rests upon the ledge or collar $f$, the said piston being preferably composed of three parts, namely, a part, $h$, which may be made of any non-corrodible material, it being placed next to the mustard or other condiment, and which fits the interior of the pot freely enough to enable it to be pushed up or down easily. The part $h$ is packed tight enough to prevent leakage of the viscous contents of the pot by a disk, $i$, of india-rubber, leather, or the like, and is held in position by a screw, $j$, passed through a solid disk, $k$, of suitable material, and through the disk $i$ into or through the part $h$.

When it is desired to serve from the pot, the stopper or cover $c$ or $c'$ is removed and the piston is pushed upward with the thumb or finger from beneath, and to clean or refill the pot the parts of which it is composed are easily taken asunder.

With this invention, besides the advantages of dispensing with a spoon, it is found that the contents of the vessel are maintained in much better condition.

Having now described my invention, what I desire to claim, and secure by Letters Patent, is—

The combination of a tube or cylinder, $a$, open at both ends, neck $b$, fitted within its upper end, a closure for the neck, casing $e$, having a ledge, $f$, at its lower end for the bottom of cylinder $a$ to rest on, cover $g$, inclosing the neck $b$ and secured to the casing $e$, and a piston or expeller contained within the body $a$, substantially as shown and described.

In witness whereof I have hereunto set my hand and seal this 16th day of March, 1888.

R. H. FINLAY. [L. S.]

Witnesses:
 GEO. M. CRUIKSHANK,
*Fel. Inst. Patent Agents, 62 St. Vincent Street, Glasgow.*
 WALLACE FAIRWEATHER,
*Fel. Inst. Patent Agents, 62 St. Vincent Street, Glasgow.*